United States Patent [19]

Kagami

[11] Patent Number: 5,305,116
[45] Date of Patent: Apr. 19, 1994

[54] IMAGE TRANSMISSION DEVICE

[75] Inventor: Naoto Kagami, Yokohama, Japan

[73] Assignee: Canon Kabushiki Kaisha, Tokyo, Japan

[21] Appl. No.: 679,944

[22] Filed: Apr. 3, 1991

[30] Foreign Application Priority Data

Apr. 6, 1990 [JP] Japan .................................. 2-90380
Apr. 6, 1990 [JP] Japan .................................. 2-90381

[51] Int. Cl.⁵ .................................... H04N 1/40
[52] U.S. Cl. ................................... 358/448; 358/445
[58] Field of Search ............... 358/400, 401, 407, 405, 358/448, 442, 443, 445; 379/100

[56] References Cited

U.S. PATENT DOCUMENTS 4,970,603 11/1990 Kanai ................................. 358/400
4,974,097 11/1990 Kaneko et al. ..................... 358/400
5,041,915 8/1991 Hirota et al. ....................... 358/407

FOREIGN PATENT DOCUMENTS 0361857 4/1990 European Pat. Off. ........ H04N 1/40
0389164 9/1990 European Pat. Off. ....... H04N 1/387
3739030 5/1988 Fed. Rep. of Germany ......... H04L 25/00
62-183265 1/1988 Japan ............................. H04N 1/40
2-053382 5/1990 Japan ............................. H04N 1/32

Primary Examiner—Edward L. Coles, Sr.
Assistant Examiner—Jerome Grant, II
Attorney, Agent, or Firm—Fitzpatrick, Cella, Harper & Scinto

[57] ABSTRACT

An image transmission device is capable of transmitting image data in different resolutions with different pixel number of the image. The gamma correction values are converted in proportion to the transmittal resolution of the image data and the quasi half-tone which closely follows the original image is reproduced with less degree of omission of minute lines.

14 Claims, 5 Drawing Sheets

IMAGE TRANSMISSION DEVICE

BACKGROUND OF THE INVENTION

1. Field of the Invention

The present invention relates to an image transmission device capable of transmitting image data in different resolutions with different pixel numbers of the image.

2. Related Background Art

In order to transmit an image of characters, tables, pictures etc. recorded on books, documents etc., there is used a facsimile apparatus which transmits and receives image data in form of electric signals by photoelectric conversion of the image.

In recent years, there are known similar transmission devices, for example a Group-4 facsimile apparatus equipped with a high speed digital circuit, having usually 400 DPI (dot per inch) of reading resolution. The subscribers, however, may use Group 4 facsimile apparatus with 200 DPI resolution or Group 3 facsimile apparatus with 8 pel/mm × 3.85 line/mm capacity. Such being the case, the receiver has to adjust the resolution of receiving apparatus by thinning out, etc. or by speeding up the rotation of motor attached thereto so as to convert a sub-scanning resolution to 200 DPI or 8 pel/mm × 3.85 line/mm.

Also there is a widely used facsimile apparatus with a half-tone mode, utilizing an error-diffusion method or the like which enables reproduction of a clear-cut image of very sensitive materials such as photograph.

Those conventional devices, however, have been associated with the following drawbacks, although the transmittal resolution thereof is converted in the manners mentioned above.

(1) In case that the image data, read in a resolution of 400 DPI, is transmitted in 200 DPI or 8 pel/mm × 3.85 line/mm, the operation for thinning out and so on causes omission of image information, and thus provides a light image as a whole.

(2) In case that the sub-scanning resolution is converted to 200 DPI or 8 pel/mm × 3.85 line/mm by speeding up the rotation of motor, the facsimile apparatus skips in reading minute lines, and thus the image is transmitted in incomplete manners.

Namely, in case that a transmittal resolution does not match to that of receiving apparatus, it may cause inconvenience in transmitting a clear-cut image of materials.

SUMMARY OF THE INVENTION

The object of the present invention is to provide an image transmission device and method which enables transmission of a clear-cut image even in case the reading resolution of receiving apparatus is different from that of the sender's.

This invention also provides an image transmission device and method which enables transmission of a clear-cut image, preventing any omission of standard value of resolution for judging black and white by quantifying the difference in transmittal resolutions.

The present invention also provides an image transmission device and method which enables transmission of an image of half-tone mode in a manner of copying so that it looks like its original image, preventing any omissive reading of the image data by adjusting the gamma correction value which is designed to meet the characteristics of the image density in proportion to the selected transmittal resolution.

The above-mentioned and other collateral objects and effects of this invention shall be further clarified through the following explanations.

DESCRIPTION OF THE PREFERRED EMBODIMENT

Figure 1:
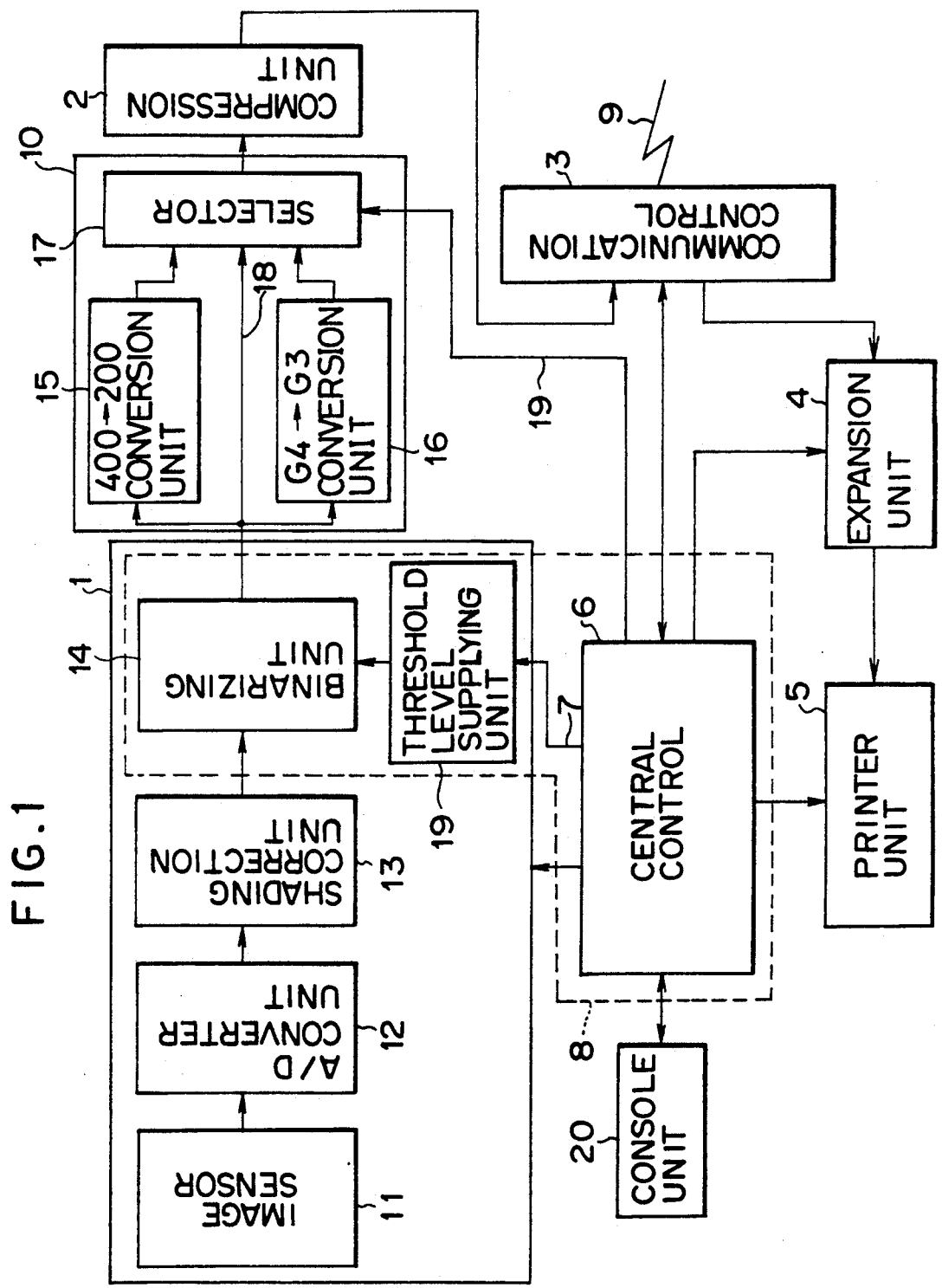
FIG. 1 is a block diagram of a type of the facsimile, embodying the present invention.

FIG. 1 is a block diagram showing a type of the facsimile, embodying the present invention. In the figure, the element 1 is a scanner which scans optically the original manuscript for transmission or copying by its CCD image sensor or other device; the element 11 in the scanner is an image sensor which enables to scan the image at 400 DPI resolution; the element 12 is an A/D converter unit which converts the analog image signal, transmitted from image sensor 11 to digital image signal; the element 13 is a shading correction unit which corrects the level of image signal by every bit; the element 14 is a binarizing unit which reads digital multiple-value data through the judgement in black and white tone by threshold levels thereof; the element 19 is a threshold level supplying unit which provides either of the two threshold levels available for the binarizing unit 14.

The element 10 is a converter unit for converting the binarized 400 DPI resolution of an image data, constituting the element 15 which is a 400/200 converter unit for converting 400 DPI image data to 200 DPI image data, the element 16 which is a G4/G3 converter unit for converting 400 DPI image data to 8 pel/mm × 7.7 line/mm image data applicable for G3 facsimile, the element 18 which is a line to transmit 400 DPI image data directly and the element 17 which is a selector to select one of those three transmitted data, namely 400/200 converter 15, G4/G3 converter 16 and line 18.

The 400/200 converter unit 15 thins out every other line of 400 DPI image data to be transferred into each line and further thins out every other pixel of such lost image data. This operation is designed to reduce the resolution to half in both main scanning direction and auxiliary scanning direction. Accordingly, 400 DPI image data is converted to 200 DPI image data. It provides not only a simple thinning out operation but other selective functions for thinning out in consideration of the neighboring image data by film treatments or the like.

The G4/G3 converter unit 14 is required to have a function to convert 400 DPI image data to 8 pel/mm × 7.7 line/mm which performance is not attainable through the thinning out process with a simple integral operation by use of 400/200 converter unit 15. Consequently, the G4/G3 converter unit 14 employs a method of a projective technique for converting the resolution. Following is a succinct explanation of the principle of the operation of resolution conversion by a projective technique.

Figure 3:
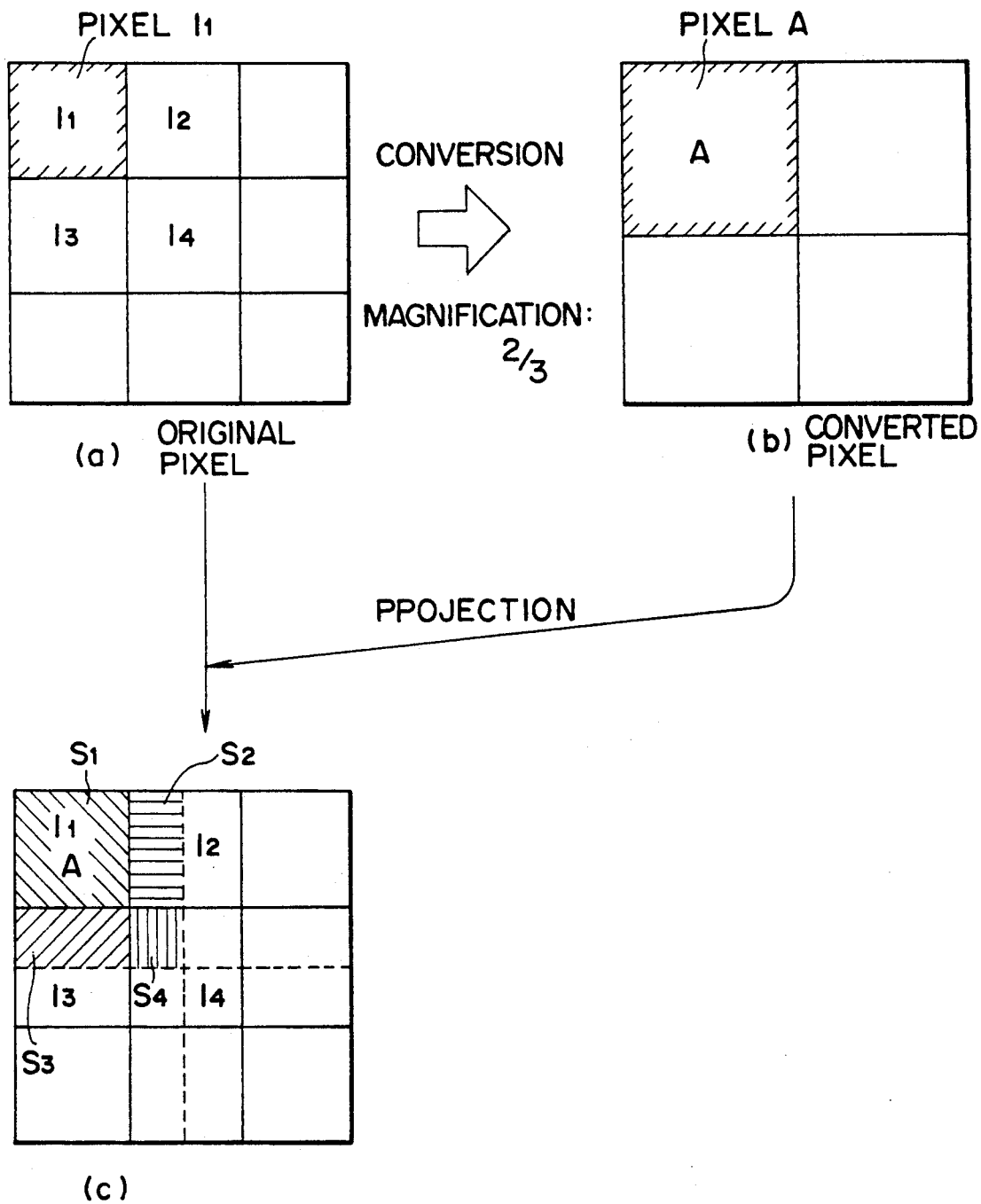
FIG. 3 is a view, showing the principle of said projective technique.

FIG. 3 shows an original pixel before it is converted by a projective technique and the converted pixel after it is converted by magnification of ⅝. The projective technique is a method to regard the shape of pre-converted pixel as a square (FIG. 3-(a), and place a rectangle of a longer side having such a length of the pre-projected pixel multiplied by the reciprocal number of conversion magnification, namely ⅝, in both main and auxiliary scanning directions (FIG. 3-(b), on top of the pre-projected pixel as shown in FIG. 3-(c)), thereby measuring a ratio of the black area contained in said rectangle as the information of density. The G4/G3 converter unit 14 employs not only thinning out operation but the above-mentioned projective technique which enables to conversion of the density of such fractions excluded those converted by a ratio of the reciprocal number of integer which is obtained by thinning out process. In other words, The G4/G3 converter unit 14 converts 400 DPI image data to 8 pel/mm × 7.7 line/mm image data by applying a certain magnification in accordance with the above-mentioned principle of projective technique. For more detailed explanation on this technique, refer to U.S. Ser. No. 492,490 which was filed by this patent applicant on Mar. 12, 1990.

As a means for converting resolutions, there is a method for converting them in auxiliary scanning direction by changing a speed of reading the image, besides the electrical operations to convert them in both main and auxiliary directions.

The element 2 is a compression unit which compresses the image data transmitted from converter 10 into the signal of MH, MR and MMR. The element 3 is a communication control which is equipped with a function of image transmission, constituted by the control of communication protocol built in Group 4 facsimile system, the control of communication protocol built in Group 3 facsimile system and the conversion-recovery processing unit. The element 4 is an expansion unit which expands the receiving image data transmitted by communication control 3. The element 5 is a printer unit which prints the image data transmitted from expansion unit 4. The element 6 is a central control unit which controls the whole functions of the captioned system. The element 7 changes the threshold level of binarizing unit 14 by control signals transmitted from central control unit 7 through the functions of the threshold level supplying unit 19. The element 19 controls the selection performance of selector 17 located in conversion unit 10 by control signals transmitted from central control unit 6. The element 8 functions to change the binarized threshold level which is constituted by central control unit 6, threshold level supplying unit 19 and binarizing unit 14 which enables to judge black and white. The element 9 is an integrated service for digital transmission network (ISDN). The element 20 is an operation unit equipped with the keys to input for instructing the addressees of information transmission, and starting the transmitted operation as well as the displays on which various information is indicated.

In the following, there will be explained the actual exemplified operations of above-mentioned facsimile embodying the present invention.

Figure 2:
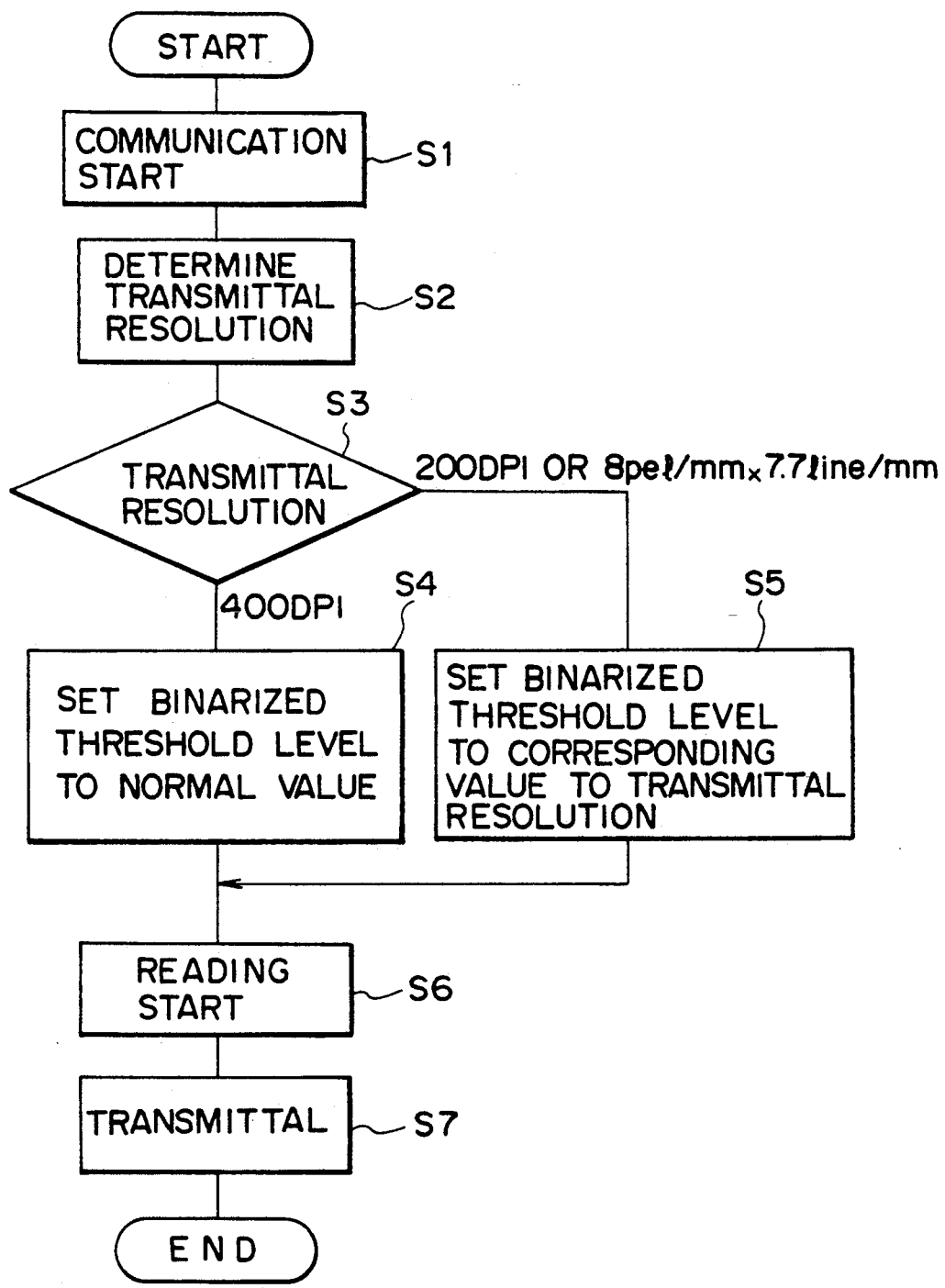
FIG. 2 is a flow chart, indicating the operation of the facsimile device shown in FIG. 1.

FIG. 2 is a flow chart which illustrates the operation of the facsimile system. After a manuscript is set scanner 1 and the instruction of the addressees concerned is given, the communication control unit starts transmitting the information in the form of image (S1). Thereafter, an appropriate transmittal resolution is determined to meet the requirements of receiving facilities through the communication with the addressees and selector 17 starts functioning to set up such a resolution (S2). Central control unit 6, installed in the facility 8 which enables to change the binarizing threshold level, sends an instruction by control signal 7 to binarizing unit 14 to provide an appropriate threshold level for 400 DPI through threshold level supplying unit 19, in case the transmittal resolution is set as 400 DPI (S3, S4).

In a similar manner, in case the transmittal resolution is determined as 200 DPI or 8 pel/mm × 7.7 line/mm, the threshold level control signal 7 reaches the threshold level supplying unit 19 which instructs the binarizing unit 14 to provide an appropriate threshold level for 200 DPI (S3, S5).

In comparison with the resolution of 400 DPI, the resolutions of 200 DPI or 8 pel/mm × 7.7 line/mm provide coarser images which is analyzed to have a wider distance between pixels or lines thereof, thus having a lighter reproduction density of the image. Consequently, when 200 DPI or 8 pel/mm × 7.7 line/mm is to be adopted, it is necessary to adjust the threshold level through central control unit 6 so that the density of image reading is set darker than the level to be applied for 400 DPI, the density of transmitted image is not lowered.

In other words, such an appropriate adjustment of threshold level makes it possible to receive the transmitted image at almost the same reproducing density in case the transmittal resolution of receiving device is not identical to that of the sender.

After the above-mentioned procedures are completed, central control unit 6 instructs scanner unit 1 to start reading the manuscript (S6). Then central control unit 6 further sends an instruction to communication control 3 to transmit smoothly the manuscript read by scanner 1 through the line 9 (S7).

As explained above, it is possible to transmit a clear-cut image and an half-tone image close to its original material with less missing information, even if the transmittal resolution is kept coarse, which performance is attained by converting the binarized threshold level selectively and appropriately whether the material is read with either 400 DPI, 200 DPI or 8 pel/mm × 7.7 line/mm resolution.

The above examples are used to explain two conversions of threshold levels. The present invention is not limitedly applied to those examples but enables conversion of the threshold level into more than 3 levels. For example, in case the data is to be transmitted by Group 3 facsimile of 8 pel/mm × 3.85 line/mm of standard resolution, it is appropriate to reset the threshold level of it.

In summary, the present invention enables transmission of a clear-cut image with less omissive reading by converting the binarized threshold level selectively in response to the transmittal resolution of the image data to be transmitted.

FIG. 1 illustrates the mechanism to read the image data in black and white tones by comparing the image data with threshold levels. Following is the explanation of a facsimile system which enables to transmit an image of half-tone mode such as a photograph to the receiving apparatus without losing the half-tone mode.

Figure 4:
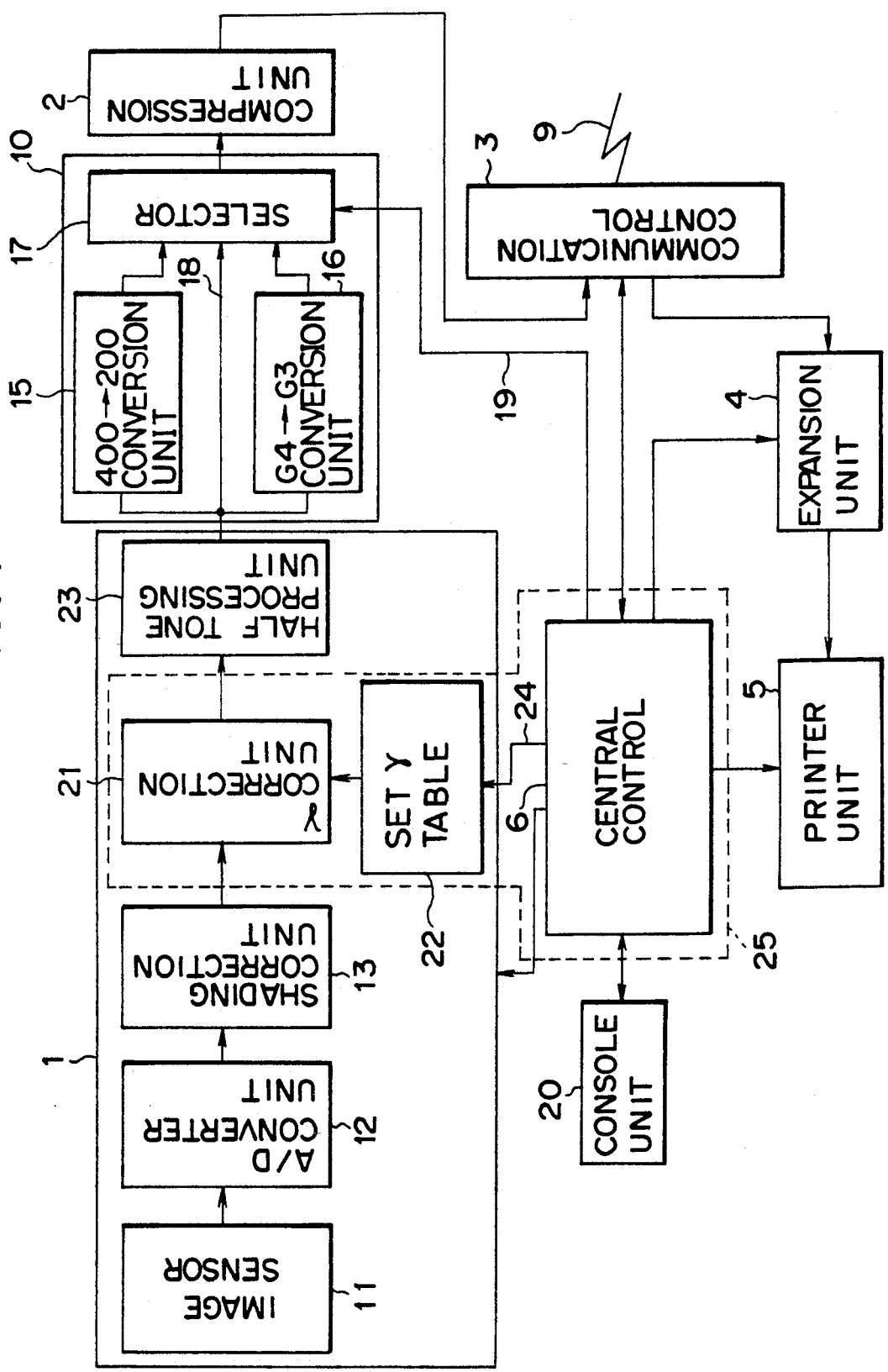
FIG. 4 is a block diagram of another type of the facsimile, embodying the present invention.

FIG. 4 is a block diagram of a facsimile related to the present invention. In FIG. 4, those circuit component blocks shown in FIG. 1 are identified with same symbols and the explanations thereabout are omitted.

On behalf of binarizing unit 14 and threshold level supplying unit 19 illustrated in FIG. 1, the captioned facsimile system employs the gamma correction unit 21 which converts the density of digital image signal transmitted from A/D converter 12, the gamma table controller which controls the conversion properties of gamma correction unit 21 and the half-tone processing unit 23 which accommodates dummy half-tone processing such as error-diffusion treatment and disa-processing for the signals of digital image.

The element 24 is a control signal which controls the conversion of correction value table of gamma correction unit 21 determined by gamma table controller 22. The control signal is regulated by central control unit 6. The element 25, consisting the central control unit 6, the gamma table controller 22 which enables to set a plural number of gamma table and the gamma correction unit 21 which converts the transmittal density of image data, has a function to convert the gamma correction values. The element 9 is an integrated service for digital communication network (ISDN).

In the following, there will be explained the functions of above-mentioned facsimile system with the present invention.

Figure 5:
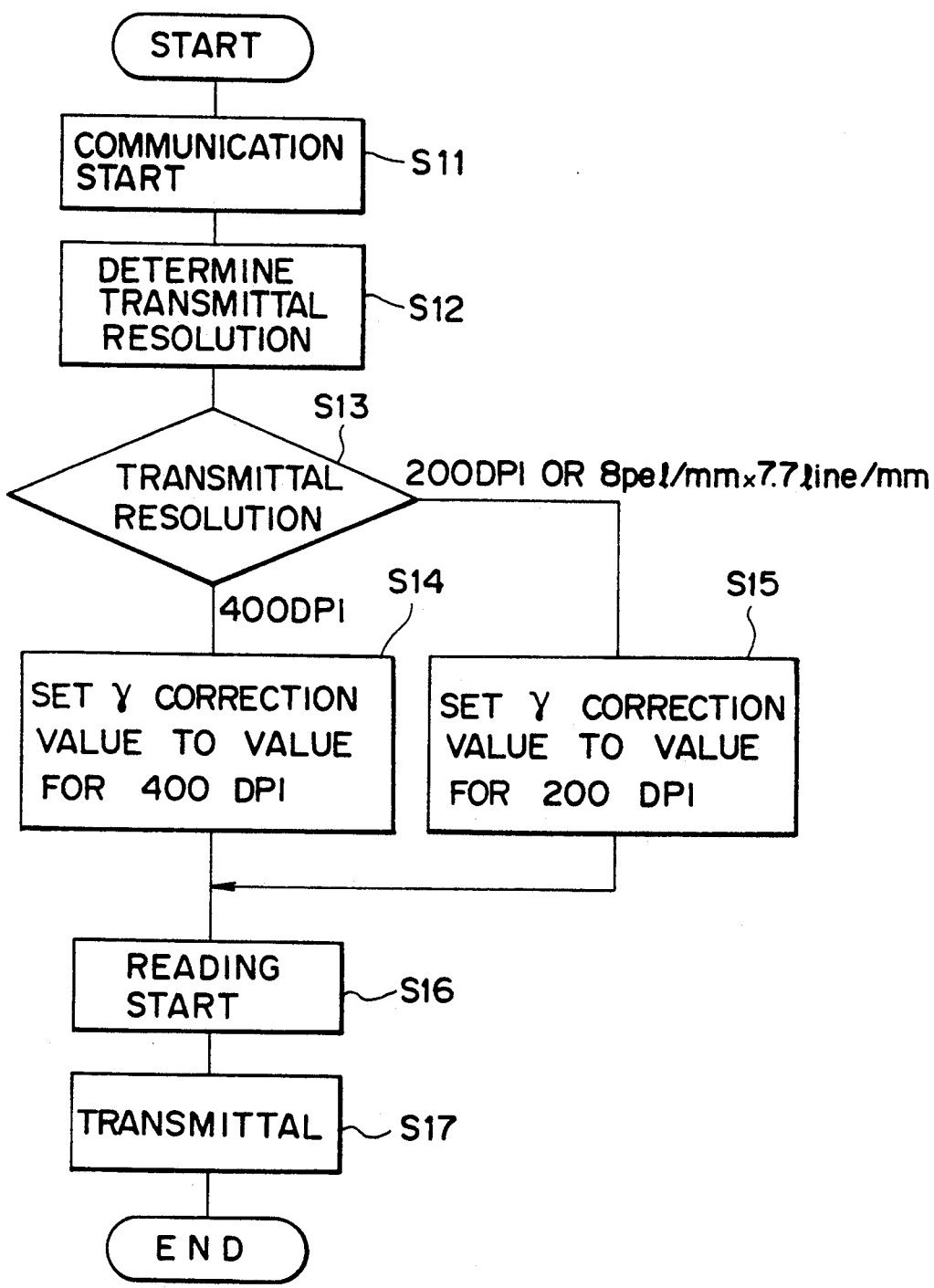
FIG. 5 is a flow chart, indicating the operation of said facsimile device shown in FIG. 5.

FIG. 5 is a flow chart showing the motion of said facsimile device. After the manuscript to be transmitted is set in scanner 1 and the addressee is instructed by operating unit 20, the communication control unit 3 starts transmitting the material (S11). Then the transmittal resolution is identified through the communication with the receiving apparatus and an appropriate transmitted resolution is set to meet that of the receiving apparatus (S22). In case the transmittal resolution is set as 400 DPI, the gamma table controller 22 functions to convert the resolution by the gamma table correction control signal 24 so that the gamma correction value is set to meet 400 DPI resolution at gamma correction unit 21 (S3, S4).

Similarly, in case the transmittal resolution is set as 200 DPI or 8 pel/mm × 7.7 line/mm, the gamma table controller 22 functions to convert the resolution by the gamma table correction control unit 22 so that the gamma correction value is set to meet 200 DPI resolution at gamma correction unit 21 (S3, S5). As explained above, the transmittal density of reproduced image is lighter (or lower) at the resolution of 200 DPI or 8 pel/mm × 7.7 line/mm, in comparison with the case of 400 DPI resolution.

Accordingly, when 200 DPI resolution or 8 pel/mm × 7.7 line/mm is adopted for transmission, it is necessary to apply the gamma value correction to image data so as to increase the transmittal density thereof. Namely the central control unit 6 adjusts the gamma correction table to provide lighter density of transmitted image than that of 400 DPI resolution. In so doing, even if the transmittal resolution is lower than the level applied for 400 DPI, the density of transmitted image is not lowered. In other words, such an appropriate adjustment of gamma correction table makes it possible to receive the transmitted image at almost the same reproducing density even if the transmittal resolution of receiving device is not identical to that of the sender. After the above-mentioned procedures are completed, central control unit 6 instructs the scanner unit 1 to start reading the material (S6). Then central control unit 6 further sends an instruction to communication control 3 to transmit smoothly the manuscript read by scanner unit 1 through the line 9 (S7).

As explained above, it is possible to transmit a clear-cut image and a half-tone image close to its original material with less missing information, even if the transmittal resolution is kept coarse, which performance is attained by converting the gamma correction table selectively and appropriately when the manuscript is read with either 400 DPI, 200 DPI or 8 pel/mm × 7.7 line/mm resolution.

The above said examples are used to explain two conversions of gamma correction values. The present invention is not limitedly applied to those examples but enables conversion of the gamma correction values into more than three values. For example, in case the data is to be transmitted by Group 3 (G3) facsimile of 8 pel/mm × 3.85 line/mm of standard resolution, it is appropriate to set an additional gamma correction value.

In summary, the present invention enables lessening of the omissive transmission of minute lines and reproduction of a similar half-tone image which looks exactly as the original image by converting the gamma correction values in response to the transmittal resolution of the image data to be transmitted. The present invention is explained as above with reference to the appropriate examples. Needless to say, however, the applications of this invention are not limited to the above-mentioned examples but can be further reformed and modified in various ways within the scope of claims specified hereto.

What is claimed is:

1. An image transmission device comprising:
generating means for generating image data representing an image to be transmitted;
image density converting means for performing a density conversion processing for the image data generated from said generating means;
resolution converting means for converting a resolution of the image;
transmission means for transmitting with one of plural transmission resolutions the image data subjected to the density conversion processing by said image density converting means; and
modification means for modifying a parameter for the density conversion processing by said image density converting means in accordance with the transmission resolution by said transmission means,
wherein said image density converting means comprises binarizing means for binarizing the image data in accordance with the parameter.

2. A device according to claim 1, wherein said transmission means comprises determination means for determining the transmission resolution to meet a transmission destination.

3. A device according to claim 1, wherein said image density converting means further comprises density characteristic conversion means for performing conversion of a density characteristic of the image data in accordance with the parameter, wherein said binarizing means binarizes the image data of which density characteristic has been converted.

4. A device according to claim 1, wherein said generating means comprises reading means for reading the image to form the image data.

5. An image transmission device comprising:
generating means for generating image data representing an image to be transmitted;

binarizing means for binarizing the image data generated from said generating means;

transmission means for transmitting the image data binarized by said binarizing means with one of plural transmission resolutions; and modification means for modifying a binarization reference of the image data by said binarizing means in accordance with the transmission resolution by said transmission means for changing a density of the image.

6. A device according to claim 5, wherein said transmission means comprises determination means for determination the transmission resolution to meet a transmission destination.

7. A device according to claim 5, wherein said generating means comprises reading means for reading the image to form the image data.

8. An image transmission method comprising the steps of:

generating image data representing an image to be transmitted;

performing a density conversion processing for the image data generated in the generating step;

converting a resolution of the image;

transmitting with one of plural transmission resolutions the image data subjected to the density conversion processing in the processing step; and modifying a parameter for the density conversion processing in the processing step in accordance with the transmission resolution in the transmission step, wherein said density conversion step comprises binarizing the image data in accordance with the parameter.

9. A method according to claim 1, wherein the transmission step comprises determining the transmission resolution to meet a transmission destination.

10. A method according to claim 8, wherein said density conversion step further comprises performing conversion of a density characteristic of the image data in accordance with the parameter, wherein in said binarizing step, the image data of which density characteristic has been converted in binarized.

11. A method according to claim 1, wherein the generating step comprises reading the image to form the image data.

12. An image transmission method comprising the steps of:

generating image data representing an image to be transmitted;

binarizing the image data generated in the generating step;

transmitting the image data binarized in the binarizing step with one of plural transmission resolutions; and modifying a binarization reference of the image data in accordance with the transmission resolution for changing a density of the image.

13. A method according to claim 12, wherein the transmission step comprises determining the transmission resolution to meet a transmission destination.

14. A method according to claim 12, wherein the generating step comprises reading the image to form the image data.

* * * * *

UNITED STATES PATENT AND TRADEMARK OFFICE
CERTIFICATE OF CORRECTION

PATENT NO. : 5,305,116
DATED : April 19, 1994
INVENTOR(S) : NAOTO KAGAMI

It is certified that error appears in the above-identified patent and that said Letters Patent is hereby corrected as shown below:

ON TITLE PAGE

In [56] References cited, insert:
--4,841,375   6/1989   Nakajima et al.--.

COLUMN 3

Line 18, "excluded" should read --excluding--.
Line 45, "captioned" should be deleted.

COLUMN 5

Lines 11-12, "disa-processing" should read --dither processing--.

COLUMN 7

Line 14, "termination" should read --termining--.

COLUMN 8

Line 4, "claim 1," should read --claim 8,--.
Line 12, "in" should read --is--.

UNITED STATES PATENT AND TRADEMARK OFFICE
CERTIFICATE OF CORRECTION

PATENT NO. : 5,305,116
DATED : April 19, 1994
INVENTOR(S) : NAOTO KAGAMI

It is certified that error appears in the above-identified patent and that said Letters Patent is hereby corrected as shown below:

<u>COLUMN 8</u>

Line 13, "claim 1," should read --claim 8,--.

Signed and Sealed this

Sixth Day of December, 1994

Attest:

BRUCE LEHMAN

Attesting Officer      Commissioner of Patents and Trademarks